(No Model.)

C. E. WHITAKER.
BICYCLE.

No. 518,338.     Patented Apr. 17, 1894.

Witnesses

Inventor
Clarence E. Whitaker
by Wright, Brown & Crossley
Attorney

UNITED STATES PATENT OFFICE.

CLARENCE E. WHITAKER, OF LYNN, MASSACHUSETTS, ASSIGNOR TO JOSIAH C. BENNETT, OF SAME PLACE.

BICYCLE.

SPECIFICATION forming part of Letters Patent No. 518,338, dated April 17, 1894.

Application filed April 14, 1892. Serial No. 429,235. (No model.)

*To all whom it may concern:*

Be it known that I, CLARENCE E. WHITAKER, of Lynn, in the county of Essex and Commonwealth of Massachusetts, have invented certain Improvements in Bicycles, of which the following, taken in connection with the accompanying drawings, is a specification.

Figure 1:
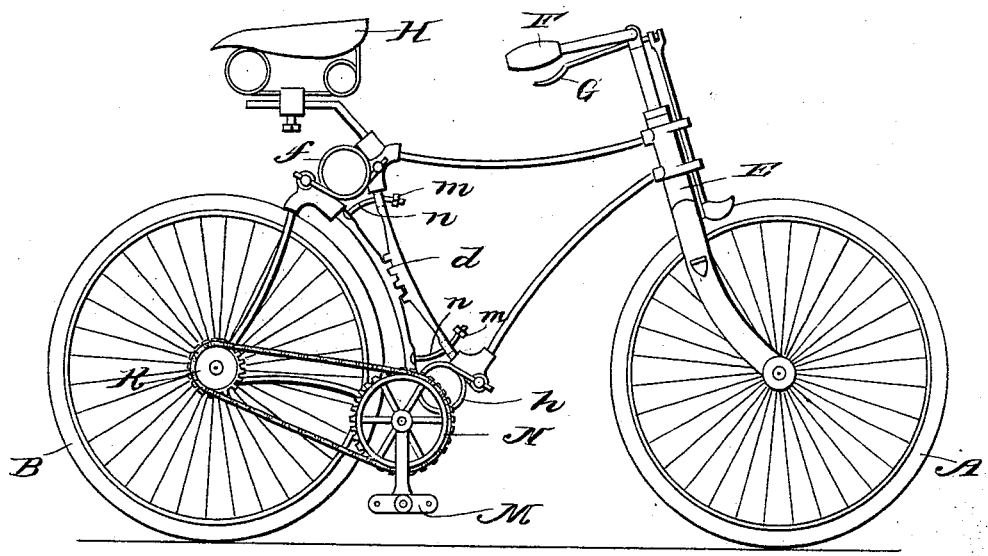
Figure 2:
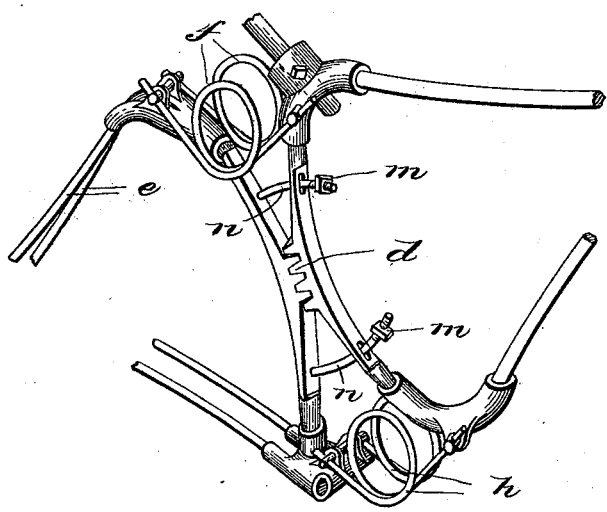

In the accompanying drawings, Figure 1 is a side elevation of a bicycle embodying this invention. Fig. 2 is a perspective view representing that portion of the bicycle frame to which this invention particularly pertains and illustrates the invention in detail.

As represented in Fig. 1 the bicycle comprises two road wheels, A, B. Suitably connected with the wheel, A, is a fork, E, handles, F, and brake attachment, G, and with the wheel, B, is connected a sprocket-wheel, between which and sprocket-wheel, N, is a chain connection to be operated by treadle device, M. All of the above named parts are of ordinary construction, as is also the rider's seat, H. The particular construction and arrangement of said parts represented in this instance are of a character known in the trade as embodied in the "diamond machine."

The particular part of said bicycle to which this invention specifically relates is represented in Fig. 2 and comprises that part of the machine known as a frame. In carrying out my invention said frame is constructed in sections. One section has one of its angle ends attached to the machine fork, E, and extends rearward. The other section has one of its angle ends attached to the axle of wheel, B, and extends forward. The said two sections being arranged in substantially the same plane approach each other and are preferably made to contact and thus establish a bearing connection d between their two contiguous sides. As represented the connection is made by interlocking tooth formations, and with this construction the fulcrum point varies with the rocking of the two sections and thereby permits more extended movement of the sections. This is more especially advantageous in case of accident whereby the wheel, A, collides with an obstacle of sufficient fixed character to suddenly stop the machine. On a line above the bearing, d, the two sections are connected by a spring, f, and on a line below said bearing the two sections are connected by a spring, h. Said springs are well stiffened and it will be understood that the rocking movements of the sections, as they take place under the weight of the rider are opposed by the tensional strain of the springs.

Rigidly secured in the rear section or member of the frame are screw-threaded bolts, n, located one on either side of the central bearing, d, and projecting through openings formed in the adjacent portion of the forward member. On said bolts are screw-threaded nuts, m, which may be turned and thereby set closely up against the said forward members of the frame, whereupon the rocking movements of the frame are prohibited from taking place and the two members of the frame are secured against movement to operate as a rigid, one-part frame, whenever the operator so desires. It is to be understood that the openings through which the bolts n pass are of sufficient size, vertically, to permit the slight relative vertical movement of the bolts to occur during the slight changing radius of movement when the sections rock upon each other on different teeth. The bolts n being rigid with one section, serve also as guides to prevent lateral or torsional movement of one section relatively to the other.

I claim—

1. In a bicycle, the combination with the wheels and the steering fork, of a two part frame having members of essentially triangular shape, said members being mounted one on the rear wheel and the other on the fork, and having tooth formations on their adjacent sides interlocking one with the other, springs interposed between the adjacent portions of the members above and below the interlocking teeth, and means to prevent lateral movement of one section upon the other.

2. In a bicycle, the combination with the wheels and the steering fork, of a two part frame having members of essentially triangular shape, said members being mounted one on the rear wheel and the other on the fork, and having tooth formations on their adjacent sides interlocking one with the other, springs interposed between the adjacent portions of the members above and below the interlocking teeth, rigid screw-threaded projections carried by one member and extending through openings in the other member, and screw-threaded nuts fitted to said projections, substantially as and for the purpose set forth.

Signed at Lynn, Massachusetts, this 26th day of March, A. D. 1892.

CLARENCE E. WHITAKER.

Witnesses:
A. M. TUTTLE,
E. E. HAMILL.